United States Patent Office 3,513,254
Patented May 19, 1970

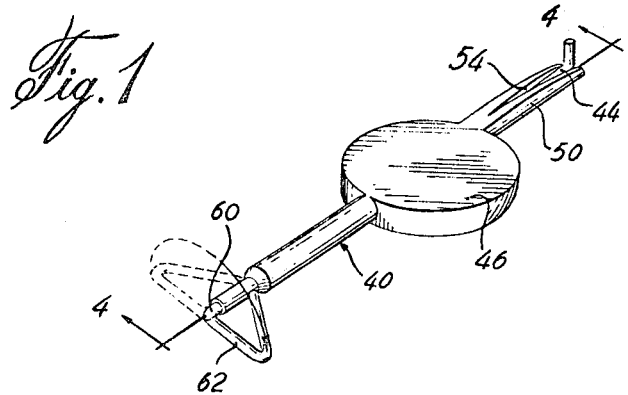
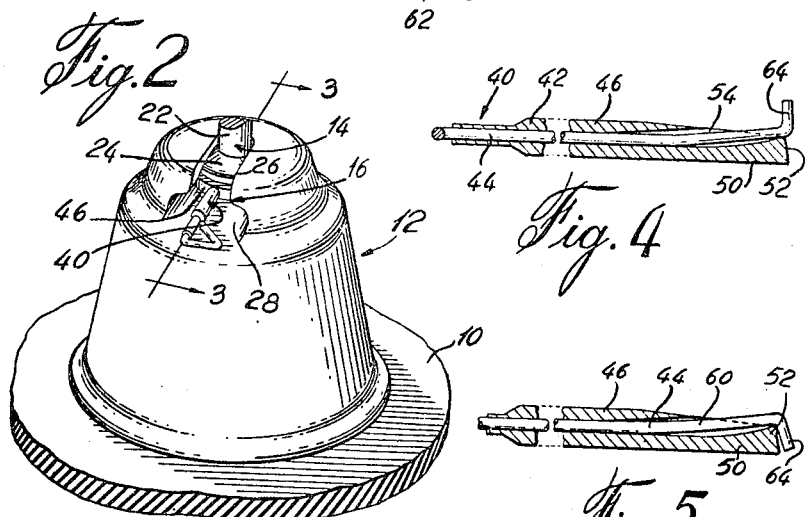
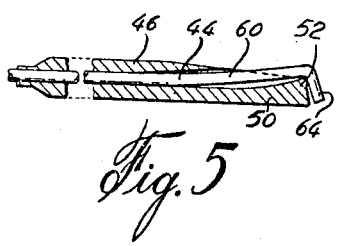
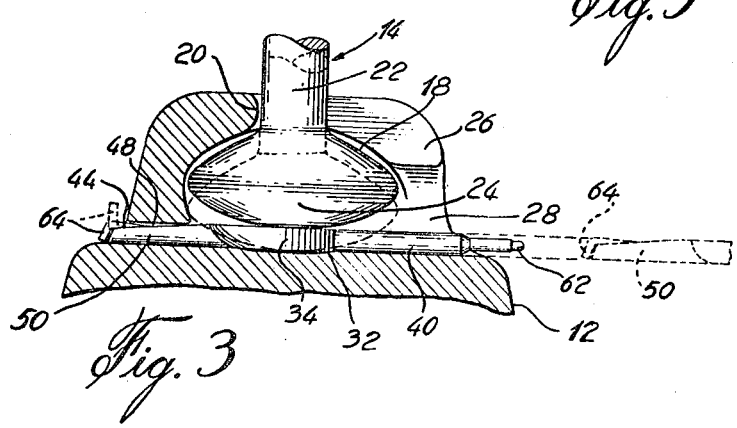

3,513,254
LOCKING DEVICE FOR PIN AND SOCKET INSULATOR CONNECTIONS
Leopold Leblanc, Victoriaville, Quebec, Canada, assignor of fifty percent to Jean Moisan, Arthabasaka, Quebec, Canada
Substituted for abandoned application Ser. No. 773,457, Nov. 5, 1968. This application Aug. 15, 1969, Ser. No. 850,374
Int. Cl. H01b 17/08
U.S. Cl. 174—150                    2 Claims

ABSTRACT OF THE DISCLOSURE

This is a locking device for use in the pin and socket connections between the electrical insulators in the strings thereof which are used for the suspension of high tension power lines; it provides a slug-like obstruction to the passage of the pin head from the socket through the slotted passage; it is inserted in position without stress or strain and secured therein by snap releasing a simple locking mechanism.

---

This invention relates to an improvement in the connecting means used in assembling the multiple electrical insulator strings of high tension transmission lines and particularly to a new and improved kind of locking pin for use in such connecting means.

The pin and socket type of connection used for linking consecutive insulators in a chain of insulators is well known in the prior art and has been variously described in a large number of patents such as for instance, U.S. Pats. Nos. 1,910,333; 2,999,125; 3,288,917 and others. The inventions disclosed in the aforementioned patents all relate to essentially the same type of pin and socket connections and differ from one another in that, not unlike the present invention, the invention in each case is directed to a different kind of locking pin for use therein.

A distinctive and most significant characteristic of the locking pin of the present invention is that it can be inserted and positioned most easily and effortlessly and can thereafter be locked in position by an effortless snap release of some simple preloaded locking means; it is also an advantage of the locking pin of the invention that all the stresses induced therein by the preloading are relieved upon release of the locking means, i.e. there are no residual stresses within the locking pin after it has been installed.

The significance of the aforementioned characteristics and the advantages that result therefrom are best understood by considering that they are making it possible for the high tension line workers to insert and withdraw locking pins without using any kind of gripping or setting tools. The most precarious and hazardous conditions under which the work of high tension line workers has to be performed can only serve to underline the importance of an advantage such as that of being able to avoid the use of tools.

It is also an advantage of the locking pin of the present invention that it lends itself to being realized in a highly durable form so as to require less frequent replacement due to excessive wear and corrosion. It is understood that much of the maintenance work which has to be performed on high tension transmission lines involves periodic replacement of the locking pins used in the connections between insulators.

The invention is designed to be used in the connection between consecutive insulators of strings of such insulators by providing in such connections a massive obstruction to the return passage of a hanging pin head through the slotted passage in which the pin head is pushed prior to becoming lodged in a receptacle therefor.

A better understanding of the invention will be derived from consideration of the following disclosure of preferred embodiments thereof, reference being made throughout to the accompanying drawing thereof, wherein:

FIG. 1 is a perspective view of a locking pin device in accordance with the present invention;

FIG. 2 is a perspective view of a connection between insulators wherein locking is achieved through use of a locking pin of the present invention;

FIG. 3 is a cross-sectional view taken along line 3—3 of FIG. 2;

FIG. 4 is a cross-section taken on line 4—4 of FIG. 1;

FIG. 5 is a cross-sectional view similar to that of FIG. 4 but wherein the conditions represented thereby coincide with those accompanying the attitude shown in dotted lines in FIG. 1;

Figure 6:
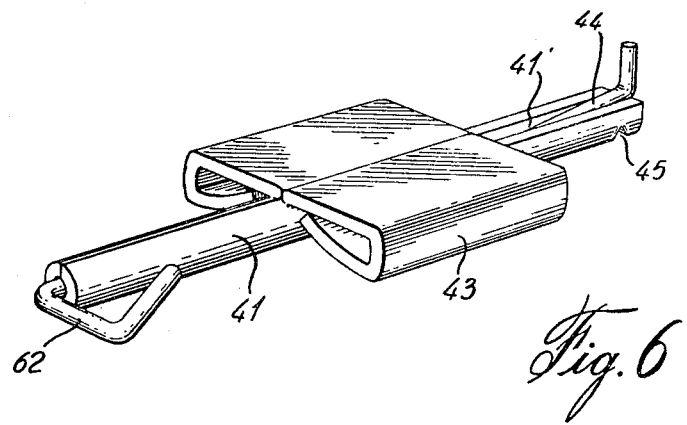
FIG. 6 is a perspective view of another preferred embodiment of the locking pin of the present invention.

In the strings of insulators which are used for the suspension of high tension power line wires, each insulator usually consists of a core or body 10 of electrically insulating material such as ceramic, generally having the shape of a disk or dish and presents some metallic coupling means which are disposed above and below it. The coupling means above the insulator body consist of an inverted cup-shaped receptacle 12 whereas the coupling means located below the insulator consist of a hanging pin 14.

With particular reference to FIGS. 2 and 3 of the drawing, it is seen that there is formed in the bottom or uppermost part of the inverted cup-shaped receptacle 12, a hanging pin receiving portion consisting of a radially extending slotted passageway 16 leading into centrally disposed and axially extending bore 20 and recessed cavity or socket 18 at the inner end thereof.

The pin 14 comprises a shank 22 and an enlarged head 24 at the lower end thereof.

The radially slotted passageway 16 presents a vertical portion 26 the width of which is at least equal to the diameter of the shank 22 but shorter than the diameter of the enlarged head 24 and, a horizontal portion 28 the width of which is at least equal to or slightly larger than the diameter of the head 24. Generally speaking it can be said that the cross-section of the slotted passageway is slightly larger than the corresponding profile of the lower end of the pin 14 so as to provide sufficient clearance for easy passage therethrough of the said pin; the resulting slotted passageway having the cross-sectional configuration of an inverted T. At the inside end of the passageway and in the region of the junction between the horizontal portion 28 and the vertical portion 26 thereof, there is formed the socket or upwardly extending recess 18 wherein the pin head 24 of the insulator located immediately above falls when insulators are strung and hung; thereby leaving an empty gap or space 34 between the lower extremity of the pin 14 and the floor of the slotted passageway.

Various means have been proposed for blocking the pin in position in recess 18 through the positioning of an obstructing gap filling device in space 34. The present invention is particularly directed to a new and improved form of such locking means.

FIGS. 1 and 6 through 8 show two embodiments of the new locking means, these being shown out of association with the insulators. In the embodiment of FIG. 1 the locking pin may be observed to have relatively massive construction whereas in the second embodiment the locking pin is of sheet metal construction.

The first embodiment is observed to consist of a tubular member or sleeve 40 in the internal conduit 42 of which there is a metallic rod 44. Centrally disposed between the ends of the tubular member 40 there is a flat integrally formed enlarged slug-like portion or blocking pad 46 the thickness of which approaches that of the gap 34 which it is intended to fill.

At the inner end of the slotted passageway 16, extending radially therefrom through the cup-shaped receptacle 22 and at the level of gap 34, there is a hole 48 wherein the end portion 50 of the tubular member 40 is received, said end portion 50 having approximately the same length as the said hole 48.

At or near the extreme end of the portion 50 of the tubular member there is an obstructing portion or ridge 52 filling the tubular opening and a longitudinally extending slot 54 in said end portion 50 of the tubular member 40.

The rod 44 presents a handle portion 62 and extends through the tubular member 40 fully from one end thereof to the other and has a short rectangularly bent latch portion 64 at said other end.

The rod 44 is made of a resilient metal and the portion thereof that extends through the said other end portion of the tubular member or sleeve 40 is given a preset curvature so that it may project over the ridge 52 without stress when the latch portion 64 extends outwardly so as to prevent withdrawal of the locking pin by engagement of the edge of the hole 48. The length of the latch 64 is roughly equal to the diameter of the sleeve 40 so that, as it is in released position such as shown in FIG. 5, no portion thereof will interfere with the free passage of the tubular member through the hole 48; to withdraw the latch 64 it is sufficient to rotate the rod through approximately 180°, thereby inducing gradually enough stress and frictional resistance to prevent it from snapping back into locking position when the rod has been rotated 180° or nearly so from locked position.

Figure 7:
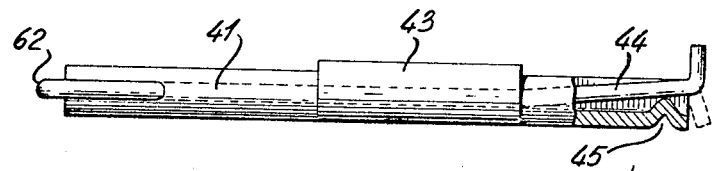
FIGS. 7 and 8 are side elevation and plan views thereof respectively.
Figure 8:
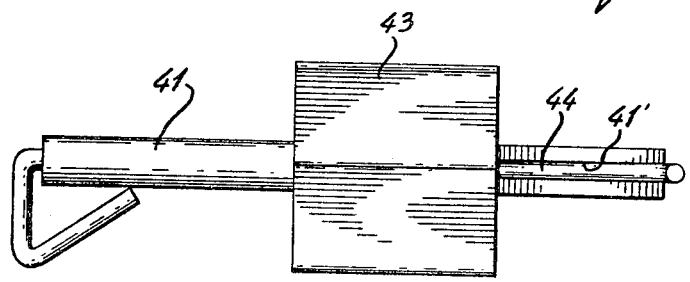

With particular reference to FIGS. 6, 7 and 8, it is seen that the second embodiment of the invention is one in which the locking pin is made of a continuous length of sheet metal tubing 41 and has an integrally formed wing-like gap-filling pad 43, the tubular member 41 being shaped as a trough 41' at the portion thereof which extends beyond the gap-filling pad 43. In this instance, the terminal bridge over which the rod 44 is forced upwardly has the form of a ridge 45 produced by crimping.

I claim:

1. A locking device for pin and socket connections in insulator strings, said locking device comprising a rod rotatable inside a tubular sleeve, said rod presenting a handle at the portion thereof extending beyond one end of said sleeve; and a rectangularly bent projection at the portion thereof extending at the other end of said sleeve, a ridge across the aperture of said sleeve at said other end thereof, a short longitudinally extending slot in said sleeve opposite said ridge, said rod passing over said ridge and through said longitudinally extending slot, said rod having preset curvature in the portion thereof exposed by said longitudinally extending slot whereby to pass over said ridge without bending, said curvature being the common plane of the rod and rectangularly bent projection thereof, said curvature being toward the same side of said rod as that toward which the rectangularly bent projection extends, said rectangularly bent projection having length essentially equal to the outside diameter measurement of the tubular sleeve, said sleeve presenting a flat enlarged blocking portion disposed at a portion thereof intermediate between the said one and other end thereof.

2. A locking pin for use in connecting consecutive insulators in a string of electrical insulators in which each insulator comprises an electrically insulating body provided at its top with a cap wherein a socket is formed and at its bottom with a hanging pin; said hanging pin having a shank portion and an enlarged head at the lower end thereof, said head being introduced into said socket by way of a laterally extending slotted passage in said cap and entering said socket at the lower portion thereof, said head becoming locked in the upper portion of said socket by the positioning thereunder and over the lowermost central portion of the slotted passage of a locking pin consisting of a flat slug and two tubular stems extending horizontally therefrom in opposite directions and contiguously with a diametrically extending hole through said slug; a rod having a gripping portion formed at one end and a latch portion at the other end, said rod extending through said tubular stems and the hole through said slug; the first tubular stem being the one nearest the gripping portion of said rod; the second tubular stem being the one nearest the latch portion of said rod, said second tubular stem presenting a longitudinally extending slot and a terminally disposed transverse ridge, whereby said rod must pass thereover and through said longitudinally extending slot; said rod having a preset curvature through at least the length thereof that extends in the second tubular stem, whereby to pass effortlessly over the said terminally disposed transverse ridge when the latch is in engaging position, and whereby said rod is stressed in bending when, upon rotation of the rod through any angle the latch is in disengaging position wherein it projects inwardly but does not exceed alignment with the outside surface of the said second tubular stem, said rod being stressed in bending for all positions thereof other than that which coincide with the engaging position of the dependent latch member; said second tubular stem extending through a hole in said cap and said latch engaging the cap outer surface around said hole therethrough.

References Cited

UNITED STATES PATENTS 3,288,917  11/1966  Preston _____ 174—150

FOREIGN PATENTS 1,442,494  5/1966  France.
231,775   7/1944  Switzerland.

LARAMIE E. ASKIN, Primary Examiner

U.S. Cl. X.R.
85—8.3; 174—182